United States Patent [19]
Tsai

[11] Patent Number: 5,590,897
[45] Date of Patent: Jan. 7, 1997

[54] STRUCTURE OF CARRIAGE

[76] Inventor: James Tsai, 103, Ta Ming 1 Rd., Tung Pao Tsun, Tan Tzu Hsiang, Taichung Hsien, Taiwan

[21] Appl. No.: 354,043

[22] Filed: Dec. 6, 1994

[51] Int. Cl.⁶ .................................................. B62B 1/12
[52] U.S. Cl. ........................................ 280/655; 280/47.29
[58] Field of Search ........................... 280/47.131, 652, 280/655, 655.1, 47.24, 47.315, 47.27, 47.28, 47.29

[56] References Cited

U.S. PATENT DOCUMENTS

| | | | |
|---|---|---|---|
| 2,680,027 | 6/1954 | Pugdt et al. | 280/47.28 |
| 3,998,476 | 12/1976 | Kazmank, Sr. | 280/47.315 |
| 4,917,401 | 4/1990 | Iwaki | 280/47.29 |
| 5,421,605 | 6/1995 | Chen | 280/47.29 |
| 5,464,214 | 11/1995 | Tsai | 280/47.29 |

*Primary Examiner*—Richard M. Camby
*Attorney, Agent, or Firm*—Bacon & Thomas

[57] ABSTRACT

A carriage including a base frame and a retractable handle vertically mounted on the base frame, wherein the base frame has a track in the middle, a slide plate moved in and out of the track, spring means connected between the track and the slide plate to force the slide plate out of the track, and lock means controlled to lock the slide plate inside the track.

2 Claims, 3 Drawing Sheets

STRUCTURE OF CARRIAGE

BACKGROUND OF THE INVENTION

The present invention relates to carriages, and relates more particularly to the frame unit of a hand truck or luggage carrier which has a slide plate mounted on the base frame and moved between two alternative positions according to the volume of the load.

Regular hand trucks and luggage carriers are commonly equipped with a retractable handle, that can be collapsed when the hand truck or luggage carrier is not in use. However, the base frames of regular hand trucks and luggage carriers are commonly fixed and cannot be adjusted according to the volume of the load. If the volume of the load surpasses the capacity of the hand truck or luggage carrier, the excessive volume of the load must be separately carried by the user.

SUMMARY OF THE INVENTION

The present invention has been accomplished to provide a base frame for a hand truck or luggage carrier which can be adjusted according to the volume of the load to be carried.

According to the present invention, the carriage comprises a base frame and a retractable handle vertically mounted on the base frame, wherein the base frame has a track in the middle, a slide plate moved in and out of the track, spring elements bilaterally connected between the track and the slide plate to force the slide plate out of the track, and lock means controlled to lock the slide plate inside the track.

DETAILED DESCRIPTION OF THE PREFERRED EMBODIMENT

Figure 1:
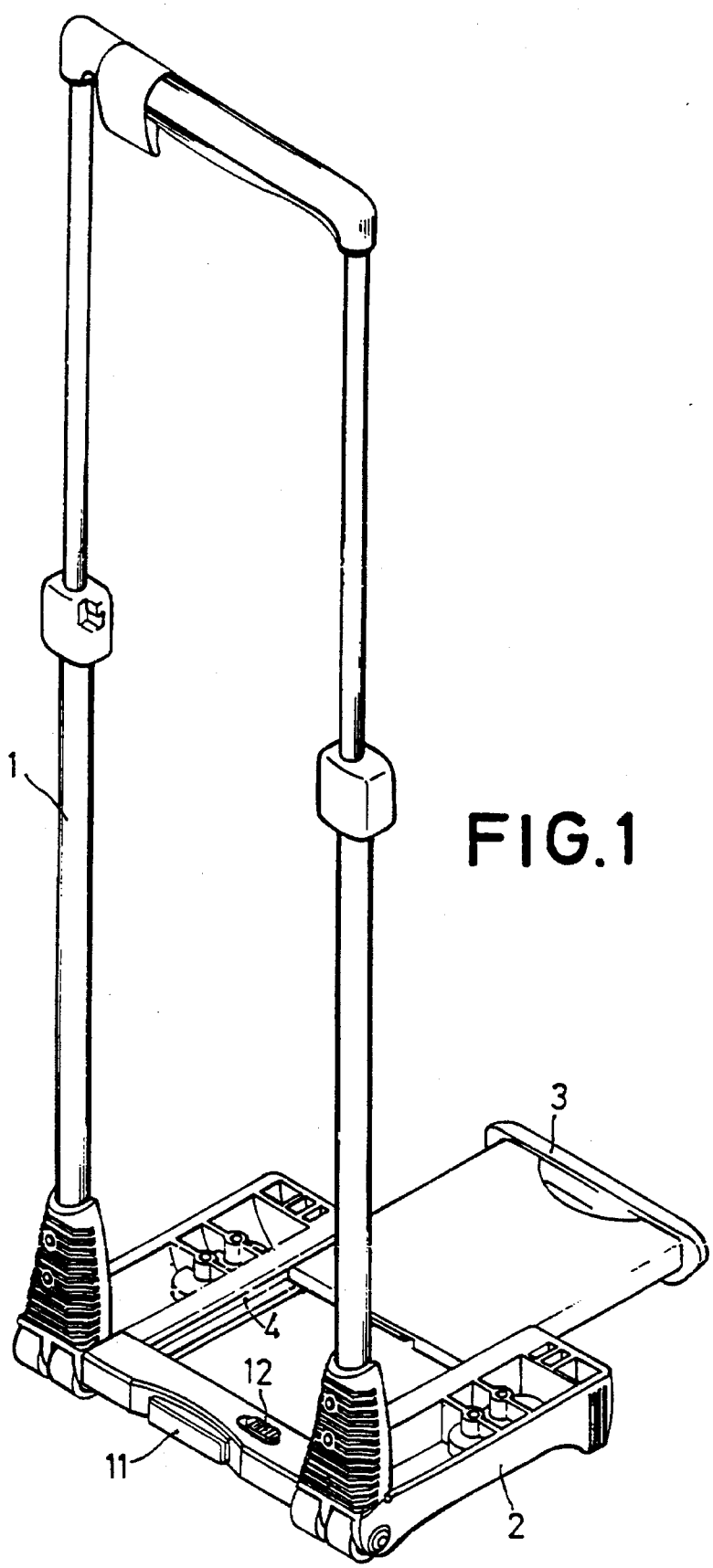
FIG. 1 is an elevational view of the preferred embodiment of the present invention.
Figure 2:
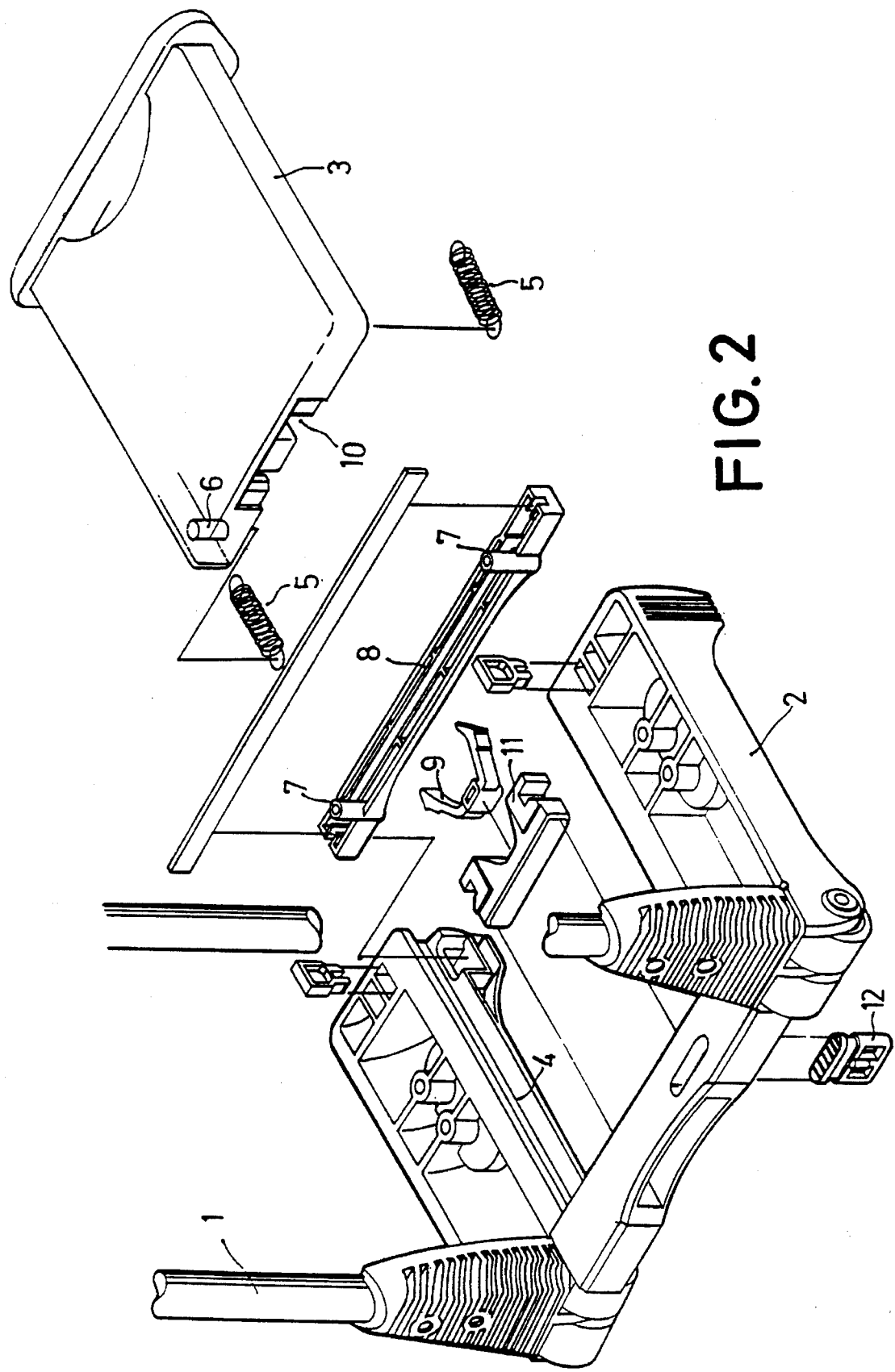
FIG. 2 is an exploded view of the preferred embodiment of the present invention.
Figure 3:
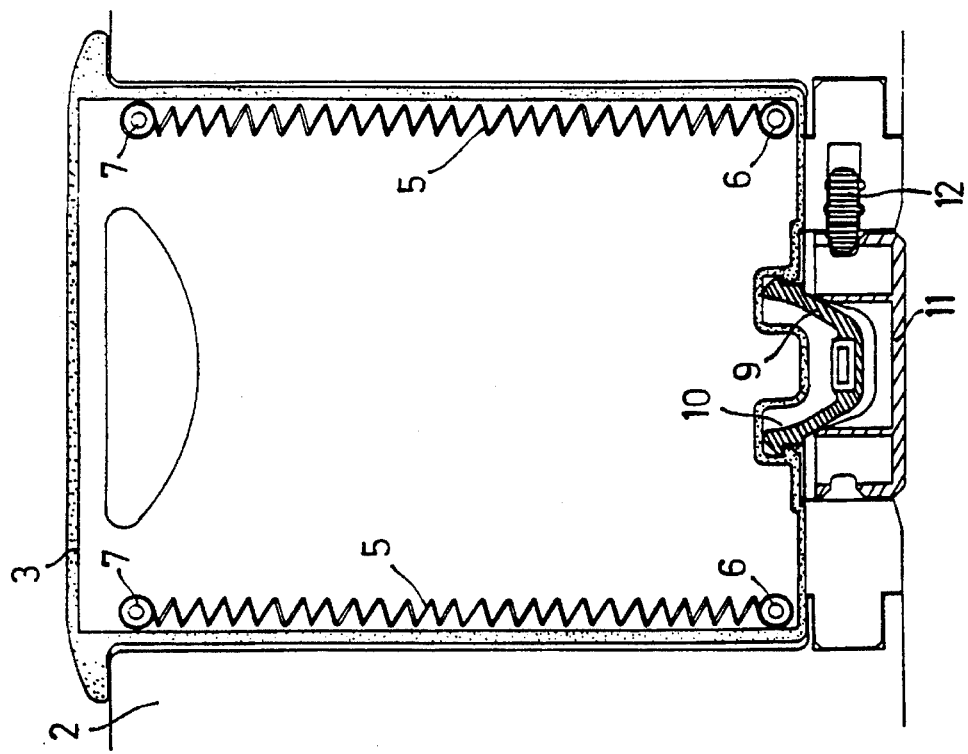
FIG. 3 is a sectional view of the preferred embodiment of the present invention, showing the slide plate received.
Figure 4:
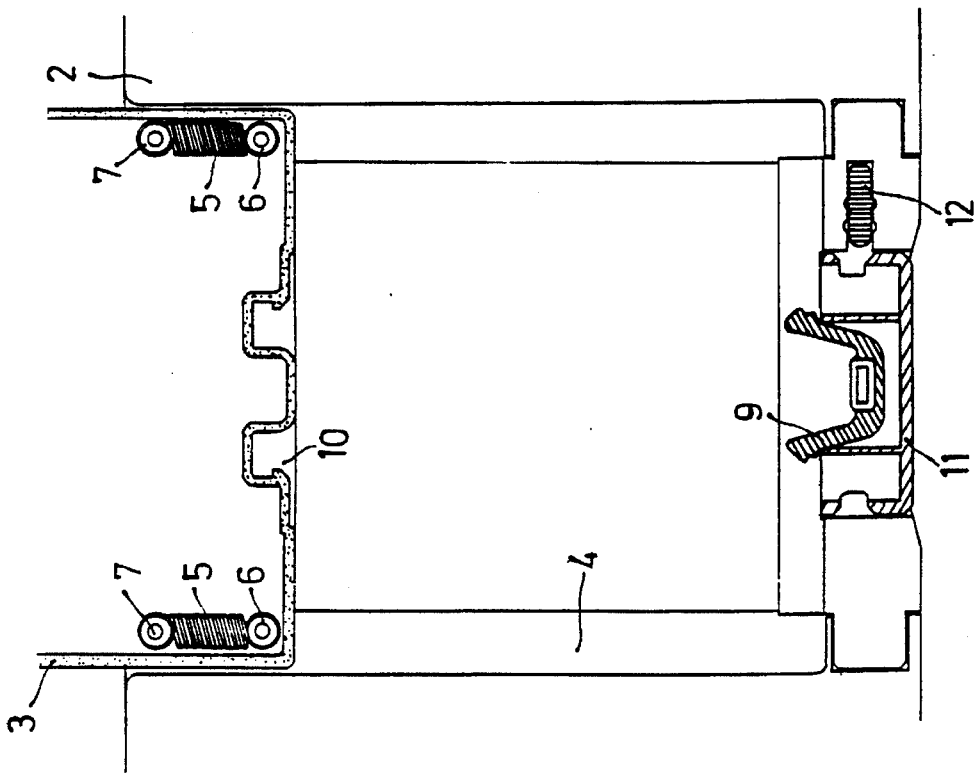
FIG. 4 is similar to FIG. 3 but showing the slide plate extended out.

Referring to FIGS. 1 through 4, a carriage according to the preferred embodiment of the present invention is generally comprised of a base frame 2, a retractable handle 1 vertically mounted on the base frame 2, a slide plate 3 horizontally moved in a track 4 in the middle of the base frame 2, and two spring elements 5 bilaterally connected between the base frame 2 and the slide plate 3. The slide plate 3 has two inside posts 6 disposed at the two opposite ends of the back side thereof. The base frame 2 has a cross bar 8 disposed at the frond side of the track 4, and two posts 7 raised from the cross bar 8 and spaced from each other at a distance equal to the pitch between the posts 6 on the slide plate 3. The spring elements 5 are respectively connected between the posts 6 on the slide plate 3 and the posts 7 on the cross bar 8. The slide plate 3 further comprises a retaining hole 10 on the back side. The base frame 2 further comprises a release control knob 11 at the back side, a retainer spring 9 fastened to the release control knob 11, and a latch 12 for locking control.

Referring to FIGS. 3 and 4 again, when the slide plate 3 is received within the track 4, the spring elements 5 are stretched, and the retainer spring 9 is forced into the retaining hole 10 to hold the slide plate 3 in the received position. When the slide plate 3 is received in the received position within the track 4, the latch 12 is moved toward the release control knob 11 to stop it from being operated. When the latch 12 is moved away from the release control knob 11, the release control knob 11 can be depressed to release the retainer spring 9 from the retaining hole 10. When the retainer spring 9 is released from the retaining hole 10, the spring elements 5 immediately return to their former shapes, causing the slide plate 3 extended out of the track 4 (the front side of the base frame 2).

While only one embodiment of the present invention has been shown and described, it will be understood that various modifications and changes could be made without departing from the spirit and scope of the invention.

What is claimed is:

1. A carriage comprising wheels attached to said carriage a base frame and a retractable handle vertically mounted on said base frame, wherein said base frame comprises a track in the middle, a slide plate moved in and out of said track, spring means connected between said track and said slide plate to force said slide plate out of said track, and lock means controlled to lock said slide plate inside said track.

2. The carriage of claim 1 wherein said lock means comprises a retaining hole on said slide plate, a retainer spring mounted on said base frame, which engages said retaining hole to hold said slide plate in position when aid slide plate is received inside said track, a release control knob controlled to release said retainer spring from said retaining hole, and latch means controlled to stop said release control knob from being operated to release said retainer spring from said retaining hole.

\* \* \* \* \*